March 28, 1939. H. C. BOWEN 2,152,345
FLUID PRESSURE BRAKING SYSTEM
Filed Sept. 17, 1936 2 Sheets-Sheet 1
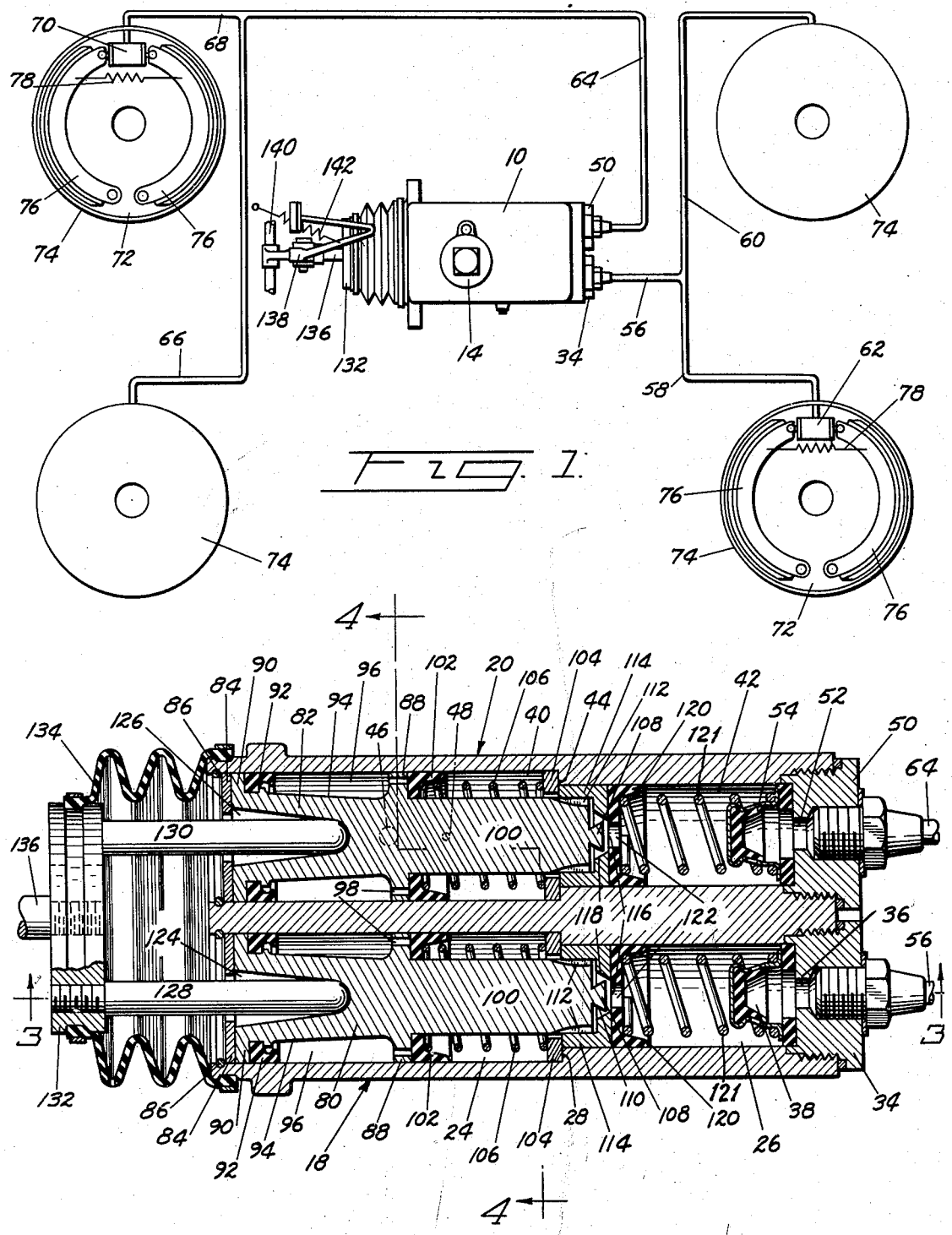
INVENTOR
HERBERT C. BOWEN
By Williams, Bradbury, McCaleb & Hinkle
ATTORNEYS

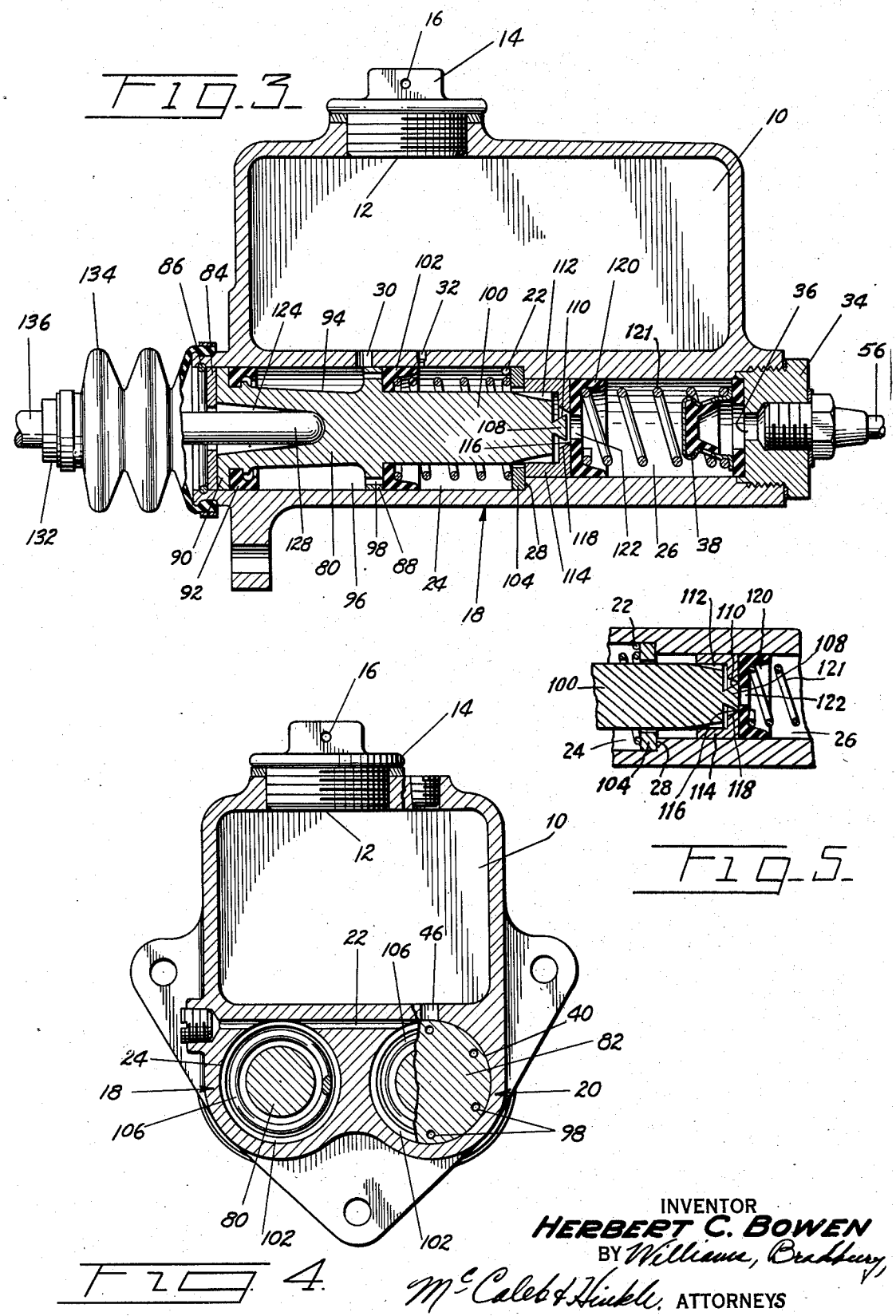
March 28, 1939. H. C. BOWEN 2,152,345
FLUID PRESSURE BRAKING SYSTEM
Filed Sept. 17, 1936 2 Sheets-Sheet 2
INVENTOR
HERBERT C. BOWEN Patented Mar. 28, 1939

2,152,345

UNITED STATES PATENT OFFICE 2,152,345

FLUID PRESSURE BRAKING SYSTEM

Herbert C. Bowen, Detroit, Mich., assignor to Hydraulic Brake Company, Detroit, Mich., a corporation of California Application September 17, 1936, Serial No. 101,201

10 Claims. (Cl. 60—54.5)

This invention relates to braking systems for motor vehicles, and more particularly to fluid pressure braking systems for motor vehicles.

The invention comprehends a relatively simple fluid pressure braking system for motor vehicles including two separate braking systems arranged for concomitant operation and interconnected so as to provide for equalization of pressures in the respective systems.

An object of the invention is to provide a duplex braking system for motor vehicles having a single operating means common to both systems.

Another object of the invention is to provide a duplex braking system for motor vehicles having means for equalizing pressures produced in the respective systems.

Another object of the invention is to provide a duplex braking system for motor vehicles including one system for actuating brakes associated with the front wheels of the vehicle and the other system for actuating brakes associated with the rear wheels of the vehicle, and to so interconnect the systems as to provide for equalization of pressures in the respective systems and also to provide for operation of one of the systems in the event of failure of the other system.

A further object of the invention is to provide a duplex braking system for motor vehicles in which failure of one system, due to breakage or leakage, during a braking operation, does not materially affect the other system.

Other objects of the invention will appear from the following description taken in connection with the drawings forming a part of this specification, and in which,—

Fig. 1 is a diagrammatical illustration of a fluid pressure braking system embodying the invention;

Fig. 2 is a longitudinal, sectional view of a fluid pressure producing device coupled in the system;

Fig. 3 is a vertical, sectional view of the fluid pressure producing device;

Fig. 4 is a cross-sectional view of the fluid pressure producing devices taken substantially on line 4—4, Fig. 2; and Fig. 5 is a fragmentary view similar to Fig. 3, but showing the shell engaging the piston to cut off communication between the large and small chambers of the cylinder.

Referring to the drawings for more specific details of the invention, 10 represents a reservoir having a filling opening 12, which may be closed as by a plug 14 provided with openings 16 for venting the reservoir to the atmosphere.

At the base of the reservoir are two corresponding cylinders 18 and 20, arranged in parallel relation to one another and interconnected as by a passage 22. The cylinder 18 has a large chamber 24 and a concentrically arranged small chamber 26 providing at the junction of the two chambers an annular shoulder 28. The large chamber has ports 30 and 32 providing communications between the large chamber and the reservoir, and the small chamber has a head 34 provided with a discharge port 36 controlled as by a two-way valve 38. Similarly, the cylinder 20 has a large chamber 40 and a concentrically arranged small chamber 42 providing at the junction of the two chambers an annular shoulder 44. The large chamber has ports 46 and 48 providing communications between the large chamber 40 and the reservoir. The small chamber 42 has a head 50 provided with a discharge port 52 controlled by a two-way valve 54.

The discharge port 36 in the head 34 of the cylinder 18 is connected by a fluid pressure delivery pipe or conduit 56 and branch conduits 58 and 60 to fluid pressure actuated motors 62 arranged for actuation of a pair of brakes associated with the wheels of a motor vehicle, and the discharge port 52 of the small chamber 40 of the cylinder 20 is connected by a fluid pressure delivery pipe or conduit 64 and branch conduits 66 and 68 to fluid pressure actuated motors 70 arranged for actuation of another pair of brakes for the vehicle.

The brakes are preferably of conventional type, each including a fixed support or backing plate 72, a rotatable drum 74 associated therewith, a pair of corresponding friction elements or shoes 76 pivoted on the backing plate, a fluid pressure motor corresponding to the motors 62 and 70 mounted on the backing plate between the separable ends of the shoes, and a retractile spring 78 connected between the shoes.

Pistons 80 and 82, reciprocable in the respective cylinders 18 and 20, are retained against displacement by washers 84 supported on retaining rings 86 seated in circumferential grooves in the wall of the cylinders adjacent the open ends thereof. Each of the pistons includes a head 88, a skirt 90 carrying a leak-proof washer 92 for inhibiting the seepage of fluid from the cylinder past the piston, and a reduced body portion 94 providing in conjunction with the wall of the cylinder an annular chamber 96 communicating with the reservoir. The piston has spaced openings 98 in its head providing communications between the annular chamber 96 and that portion of the cylinder forward of the head, and formed on the head is a concentric extension 100 projecting into the small chamber of the cylinder. The openings 98 in the head of the piston are controlled by a collapsible leak-proof cup 102 seated on the head of the piston. A washer 104, the purpose of which will hereinafter appear, is seated on the annular shoulder at the junction of the large and small chambers of the cylinder, and a spring 106 sleeved on the extension 100 between the washer 104 and the cup 102 serves to retain the washer and the cup against displacement and also to return the piston to its retracted position.

The free end of the extension 100 has a projection 108 undercut as at 110, and on the circumference of the extension are a plurality of grooves 112 for the passage of fluid. A shell 114 sleeved on the end of the extension 100 and normally seated on the washer 104 has a concentric opening 116 for the reception of the projection 108, and the perimeter of the shell defining the opening is undercut as at 118 for cooperation with the undercut 110 on the projection 108 so as to provide for free passage of fluid upon relative movement of the extension 100 and the shell 114. A leak-proof cup 120 seated on the shell 114 has a concentric opening 122. The perimeter of the cup defining the opening 120 overhangs the opening 116 in the shell and is engaged by the face of the projection 108 on the extension when the projection enters the opening in the shell so as to inhibit passage of fluid through the opening in the shell. A spring 121 interposed between the cup 120 and the two-way valve controlling the exhaust port serves to retain the cup and the valve against displacement.

The pistons 80 and 82 have in their backs recesses 124 and 126 for the reception of thrust pins 128 and 130 threaded in a suitable coupling 132 connected as by a flexible boot 134 to the open ends of the cylinders 18 and 20 for the exclusion of dust and other foreign substances from the cylinders. A rod 136 connects the coupling 132 to a foot pedal lever 138 pivoted on a suitable support 140 and connected by a retractile spring 142 to a fixed support.

In a normal braking operation, upon depressing the foot pedal lever 138, force is transmitted therefrom through the coupling 132 and thrust pins 128 and 130 to the pistons 80 and 82, resulting in moving the pistons on the compression stroke. During the initial movement of the pistons on the compression stroke, the cups 102 on the heads of the pistons close the ports 32 and 48, and thereafter the fluid in the cylinders 18 and 20 forward of the heads of the pistons is displaced through the openings 116 in the shells 114, the openings 122 in the cups 120, and the small chambers of the cylinders, past the two-way valves 38 and 54, and through the discharge ports 36 and 52 and fluid pressure delivery pipes 56 and 64 and the branches thereof into the fluid pressure actuated motors 62 and 70, causing actuation of the motors with the resultant movement of the shoes 76 into engagement with the drums 74 against the resistance of the retractile springs 78. During this movement of the pistons relatively rapid displacement takes place of the fluid in the cylinders 18 and 20, with the result that the friction elements 76 are quickly moved into engagement with the drums 74.

The cylinders are interconnected by the passage 22, and because of this there is perfect equalization of the pressures in the respective systems. As the pistons advance on the compression stroke, movement of the fluid through the cylinder lifts the shells 114 from their seats on the washers 104 sufficiently to provide for an uninterrupted flow of the fluid through the openings in the shells 114 and the openings in the cup 120. This condition prevails until the pressures in the large and small chambers of the respective cylinders balance, whereupon the springs 121 interposed between the cups 120 and the two-way valves urge the shells 114 to their seats on the extensions 100, in which position the projections 108 are received by the openings in the shells 114 and seal against the cups 120 to inhibit the flow of fluid through the shells and cups. In the normal operation of the mechanism, the pressures in the large and small chambers of the cylinders balance only when the forward motion of the pistons ceases.

Under these conditions, should either of the systems fail, due to leakage or breakage, the other system is in no way effected. This is because of a differential of pressure in the large and small chamber of the particular cylinder connected with the system remaining operative. After the loss of fluid in the ruptured system, on subsequent operations the cylinder coupled with the ruptured system is ineffective for producing pressure, and since the cylinders 18 and 20 are interconnected by the passage 22, no material pressure can be had in the cylinder connected to the system remaining effective except in the small chamber of the cylinder forward of the shell 114. This pressure is sufficient to effectively operate one set of the brakes. Under this condition it will be perfectly clear to the operator of the vehicle that a loss of braking power has been sustained. However, notwithstanding this loss, sufficient braking power will be sustained for safe operation of the vehicle until such time as repairs to the braking system may be made.

After a normal braking application, upon release of the foot pedal lever 138, the lever is returned to its normal position under the influence of the retractile spring 142. As the foot pedal lever returns to its normal position, the thrust pins 128 and 130 are retracted, resulting in releasing the pistons 80 and 82, whereupon the springs 106 become effective to return the pistons to their retracted positions. As the pistons 80 and 82 return to their retracted positions, partial vacuums are created in the cylinders forward of the heads of the pistons, resulting in drawing fluid from the reservoir into the annular chambers 96, thence through the passages in the heads of the pistons, past the cups 102, into that portion of the respective cylinders forward of the pistons, completely filling the cylinders. During this operation fluid is also returning to the cylinders 18 and 20 from the fluid pressure actuated motors 62 and under the influence of the retractile springs 78 connecting the respective pairs of friction elements 76 of the brakes. Accordingly, the cylinders receive more fluid than is essential to completely fill the cylinders, and this surplus of fluid is returned to the reservoir 10 by way of the compensating ports 32 and 48.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:—

1. A fluid braking system comprising a pair of interconnected fluid pressure producing devices each including a large chamber and a small chamber, said large chambers being interconnected and each of said small chambers being provided with an outlet, and means operative upon attaining a balanced pressure in the chambers to segregate a large chamber from a small one.

2. A fluid braking system comprising a pair of cooperative interconnected fluid pressure producing devices each including a cylinder having a large chamber and a small chamber, said large chambers being interconnected and each of said small chambers being provided with an outlet, a piston in the cylinder for producing pressure in the chambers, and means cooperating with the pistons upon attaining a balanced pressure in the chambers to segregate the large chambers from the small chambers.

3. A fluid braking system comprising a pair of corresponding cylinders each having a large chamber and a concentrically arranged small chamber communicating with the large chamber, a passage connecting the large chamber of one of the cylinders with the large chamber of the other cylinder, each of said small chambers having an outlet, pistons movable in the cylinders for producing pressure in the chambers, and means cooperating with the pistons upon attaining a balance of pressure in the chambers to segregate the large chambers from the small chambers.

4. A fluid braking system comprising a pair of corresponding cylinders each having a large chamber and a concentrically arranged small chamber communicating with the large chamber, a passage connecting the large chamber of one of the cylinders to the large chamber of the other cylinder, each of said small chambers being provided with an outlet, pistons movable in the cylinders for creating pressures in the chambers, and means cooperating with the pistons upon attaining uniform pressures in the respective large and small chambers to segregate the large chambers from the small chambers.

5. A fluid braking system including a pair of corresponding interconnected fluid pressure producing devices each having a large chamber and a small chamber arranged concentrically to and communicating with the large chamber, said large chambers being interconnected and each of said small chambers being provided with an outlet, a fluid pressure actuated motor connected to each of the small chambers, means for actuating the devices, and means operative to segregate the respective large and small chambers upon attaining uniform pressures in the large and small chambers.

6. A braking system comprising a pair of interconnected fluid pressure producing devices each including a large chamber and a small chamber communicating with the large chamber, said large chambers being interconnected and each of said small chambers being provided with an outlet, fluid pressure actuated motors connected to each of the outlets, means for actuating the devices in unison, and means in each device to segregate the large chamber from the small chamber of the same device upon attaining uniform pressures in both chambers of the same device.

7. In a fluid braking system, a pressure producing device comprising a cylinder having a large chamber and a small chamber providing an annular shoulder at the junction of the chambers, a piston movable in the large chamber having an extension projecting into the small chamber, a washer seated on the annular shoulder, a spring interposed between the washer and the piston, a movable shell in the small chamber normally seated on the washer and adapted to cooperate with the extension on the piston to segregate one chamber from the other, and a spring interposed between the shell and the head of the cylinder.

8. In a fluid braking system, a pressure producing device comprising a cylinder having a large chamber and a small chamber providing at the junction of the chambers an annular shoulder, a head on the small chamber provided with a discharge port, a valve controlling the discharge port, a reciprocable piston in the large chamber having an extension projecting into the small chamber, a collapsible leak-proof cup on the head of the piston, a washer on the annular shoulder, a spring interposed between the cup and the washer, a reciprocable shell in the small chamber normally seated on the washer and adapted to cooperate with the extension on the piston to segregate one chamber from the other, a leak-proof cup on the shell, and a spring interposed between the cup and the valve controlling the discharge port.

9. In a fluid braking system, a pair of interconnected corresponding fluid pressure producing devices each including a cylinder having a large chamber and a small chamber providing an annular shoulder at the junction of the chambers, a head on the small chamber having a discharge port, a valve controlling the port, a reciprocable piston in the large chamber having an extension projecting into the small chamber, a collapsible leak-proof cup on the head of the piston, a washer on the annular shoulder, a spring interposed between the cup and washer, a reciprocable shell in the small chamber normally seated on the washer and adapted for cooperation with the extension on the piston to segregate one chamber from the other, a leak-proof cup on the shell, and a spring interposed between the cup and the valve controlling the exhaust port.

10. A fluid braking system comprising a pair of corresponding interconnected fluid pressure producing devices each including a cylinder having a large chamber and a small chamber providing an annular shoulder at the junction of the chambers, and a head on the small cylinder provided with a discharge port, a valve controlling the discharge port, a reciprocable piston in the large chamber having an extension projecting into the small chamber, a collapsible leak-proof cup on the head of the piston, a washer on the annular shoulder, a spring interposed between the cup and the washer, a reciprocable shell in the small chamber normally seated on the washer and adapted to cooperate with the extension on the piston to segregate one chamber from the other, a leak-proof cup on the shell, and a spring interposed between the cup and the valve controlling the discharge port, fluid pressure actuated motors connected to each device, and means for actuating the devices.

HERBERT C. BOWEN.